United States Patent [19]

Petersen et al.

[11] Patent Number: 5,241,856
[45] Date of Patent: Sep. 7, 1993

[54] FLEXIBLE WEB TIRE LOADING ON TIRE COUPLED ROAD SIMULATORS

[75] Inventors: Paul S. Petersen; Joseph W. Daley, both of Minnetonka, Minn.

[73] Assignee: MTS Systems Corporation, Minneapolis, Minn.

[21] Appl. No.: 746,116

[22] Filed: Aug. 15, 1991

[51] Int. Cl.⁵ .................................. G01M 19/00
[52] U.S. Cl. .................................... 73/118.1
[58] Field of Search ............... 73/118.1, 117, 865.3, 73/865.9, 146, 669; 410/20, 21

[56] References Cited

U.S. PATENT DOCUMENTS

| | | | |
|---|---|---|---|
| 4,479,746 | 10/1984 | Huber | 410/21 |
| 4,501,139 | 2/1985 | Petersen | 73/865.9 |
| 4,527,416 | 7/1985 | Haeg et al. | 73/669 |
| 4,658,656 | 4/1987 | Haeg | 73/669 |
| 4,798,088 | 1/1989 | Haeg et al. | 73/669 |
| 4,862,736 | 9/1989 | Treitz | 73/117 |
| 4,981,034 | 1/1991 | Haeg | 73/118.1 |

Primary Examiner—Hezron E. Williams
Assistant Examiner—Nashmiya Ashraf
Attorney, Agent, or Firm—Kinney & Lange

[57] ABSTRACT

A road simulator for testing components of automobiles using a wheel assembly, including a tire that is to be loaded by simulation of actual road forces. A low mass flexible web harness is placed over the tire and has web extensions loaded in tension in at least one lateral direction for simulating forces transmitted to the tire at the tire patch without having any substantial mass applied to the tire. High strength, low mass webs are used for the loading link and harness, such as a nylon, Aramid fibers, or carbon filament materials. The harness permits simulating very closely the actual friction forces on a tire, particularly in relation to lateral direction loading without having test fixture mass affect the test.

7 Claims, 3 Drawing Sheets

FLEXIBLE WEB TIRE LOADING ON TIRE COUPLED ROAD SIMULATORS

BACKGROUND OF THE INVENTION

The present invention relates to a low mass harness and loading link that can be used for closely simulating actual road induced loads on a vehicle wheel and tire during simulated service testing.

Road simulators for testing automotive suspension systems, tires and axles, have been widely used in the prior art. Examples of such simulators include U.S. Pat. No. 4,658,656 and U.S. Pat. No. 4,981,034, both of which provide a way of simulating or emulating actual tire loadings on the suspension systems.

However, loading in a lateral direction of a tire to simulate lateral loads on the contact surfaces between the tire and the road has been a problem to precisely simulate, without compensation, because any mass that is added tends to influence the test results. Applying direct lateral loads at the plane of contact between the road and the tire is difficult under dynamic loading due to loss of load and position during wheel-hop events.

SUMMARY OF THE INVENTION

The present invention provides a harness for mounting on a tire for the simulated application of transverse road forces in tire coupled road simulators. One or more harnesses made of flexible webs are fitted to the tire in a manner to restrain motion of the web harness with respect to the tire. The harness has web loading extensions that extend from the tire adjacent to the road contact surface of the tire, where loading occurs. A lateral tension force is applied to the web extensions. The tension forces are transmitted to the tire in the location, direction and magnitude needed to simulate the forces transmitted to the tire in actual vehicle use on the road.

The vehicle suspension system, including the wheel and tire, is loaded in a vertical direction through a servo controlled hydraulic actuator. The tire is supported on a flat surface that is reciprocated by the actuator for applying vertical loads and motion while the lateral load is applied through the web harness. The web extensions are loaded in tension in a conventional manner. The accuracy of the simulation of the lateral forces applied to the tire is increased.

The harness and web extensions are usable with a single tire and vehicle suspension (¼ car), with one actuator applying tension to web extensions passing across the tire at the tire-road contact surface. Also, an entire vehicle can be tested with each tire of the vehicle having a harness made according to the present invention with the web extensions. Separate tension actuators for each tire can be used to simulate multiple dynamic and static road input forces to each of the tires.

The web harness provides for simple fixturing to apply simulated lateral forces to a tire at the tire-road contact patch or point, and the loading is done with a very low additional mass, so the mass impedance force coupling to the tire is improved. The forces are applied directly to the tire surface essentially without any mass coupling to closely simulate the actual lateral forces on a tire.

Further, the harnesses are relatively simple to make and install, and can be loaded with simple fixturing.

DETAILED DESCRIPTION OF THE PREFERRED EMBODIMENTS

Figure 1:
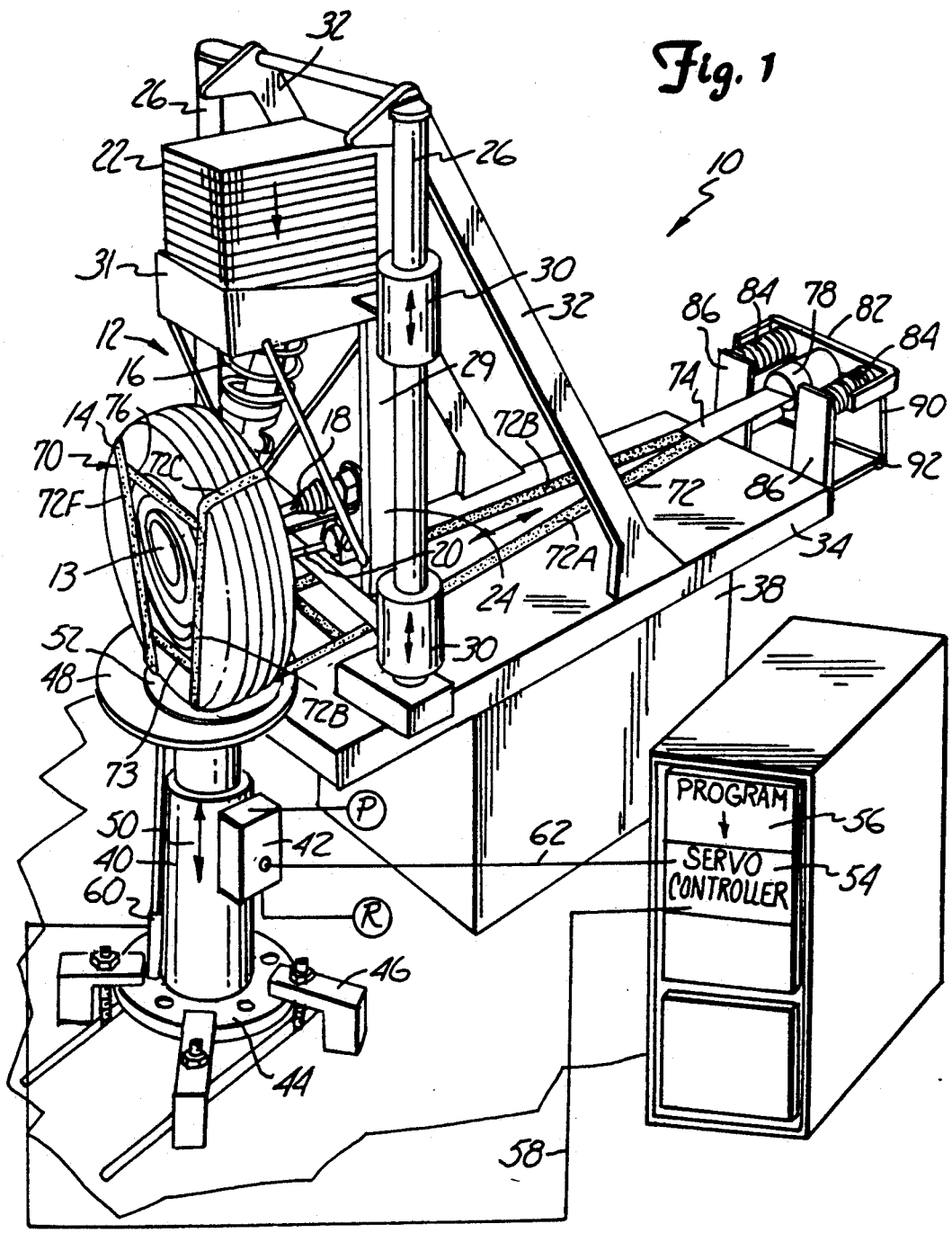
FIG. 1 is a perspective view of a road simulator for testing one suspension component on one wheel and tire, and having a loading web made according to the present invention installed thereon.
Figure 2:
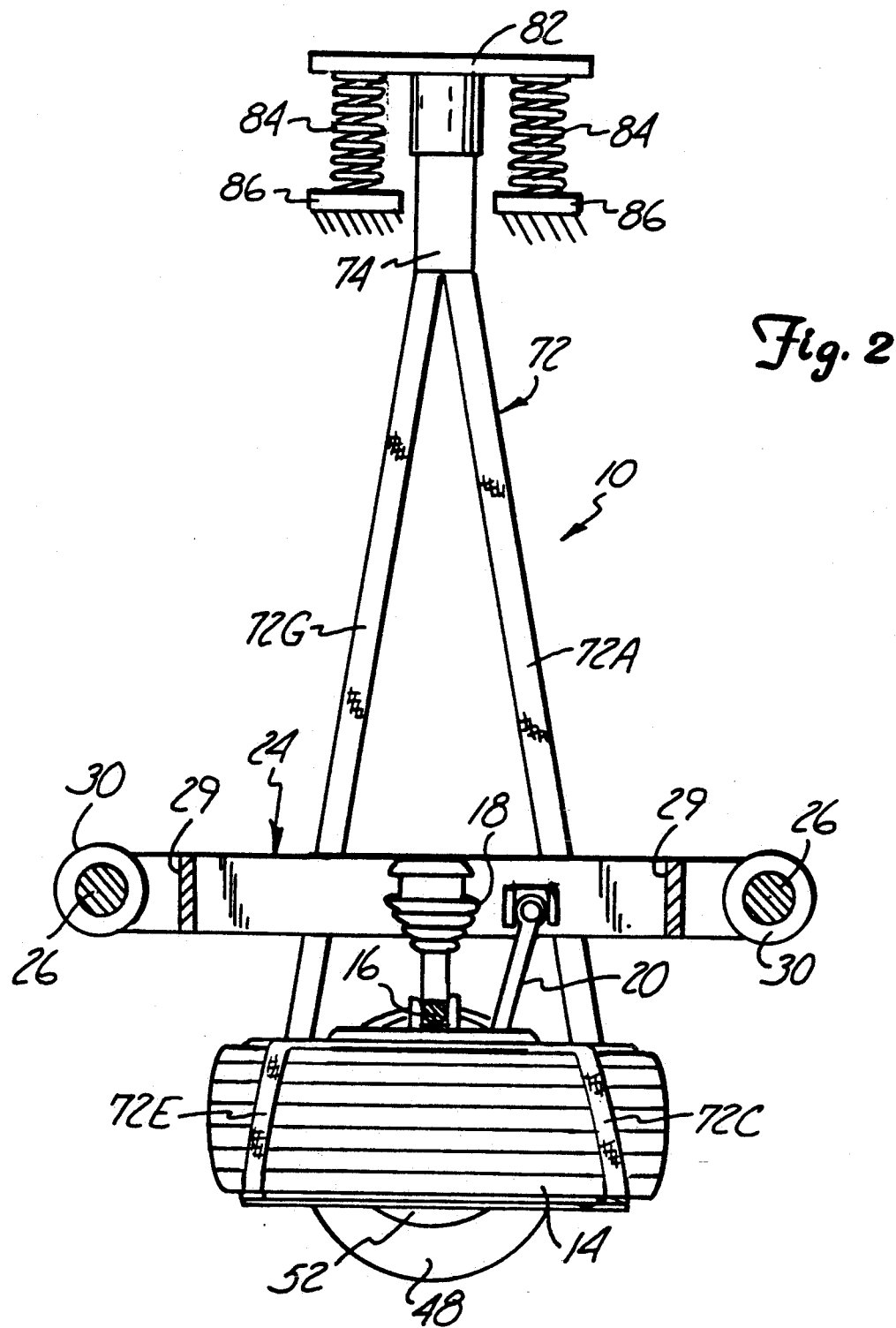
FIG. 2 is a top plan view of the unit of FIG. 1 with parts and section and parts broken away.

A road simulator indicated generally at 10 has loading components for simulating road induced loads on vehicle suspension systems. Simulator 10 is made for testing a single suspension unit 12, which supports a wheel 13 and tire 14, through which the suspension is loaded. The suspension unit 12 includes a support strut 16 such as a McPherson Strut and a drive axle shaft 18. Suitable swing arms can be used, and a tie-rod 20 for a steering arrangement is included so that an actual suspension system for a front wheel 13 supporting the tire 14 is used. The mass or weight indicated at 22 provides for varying the total mass being supported by the suspension system in accordance with the actual vehicle weight. The individual weights are used to add or subtract mass on the vehicle suspension components being tested.

The suspension components, the weights and the drive components are all mounted onto a common frame 24, which in turn is slidably mounted for vertical movement along a pair of columns 26 on sleeve like hydrostatic bearings 30 that guide vertical movement of the suspension and mass. This vertically acting mass, with low friction mountings provides the simulated vehicle weight, and the wheel and tire are coupled to the frame 24 through the normal suspension system only, which includes swing arms and other mountings. Thus, the components normally mounted on the vehicle frame and which are coupled to the wheel also move with the frame 24 on the bearings 30. The mass is mounted on a suitable support 31 that is attached to the upper bearings 30 and to uprights 29 on the frame 24. Thus the wheel 13 is supported relative to this frame 24 through the McPherson Strut assembly 16, and is connected to axle supports and drive and steering links in a normal manner. The wheel then moves independently of the frame 24 in the same manner that a wheel moves independently of a vehicle frame on which it is mounted.

The support columns 26 can be braced with braces 32 to a main mounting table 34. The columns 26 are also supported with support members 36 to table 34, which in turn is rigidly mounted onto a stand 38, and can be clamped to a large base plate or the like.

The actual tire 14 and the wheel 13 are moved and loaded in vertical direction through a schematically illustrated vertical actuator 40 that is operated through a servovalve 42 in a normal error signal control. The base 44 of the actuator 40 is clamped in position with clamps 46, to the same base plate that holds stand 38.

The actuator 40 is a double acting servo controlled hydraulic actuator that has a rod that in turn carries a support plate 48, and moves the support plate in a vertical direction as shown by the double arrow 50. The support plate 48 can optionally have a low friction bearing 52, such as a hydrodynamic bearing or one made of a low friction material for supporting the tire 14. This bearing 52 is a flat surface bearing on top of the support 48 on which the tire rests. The low friction bearing increases the accuracy of the simulation of the laterally applied force on the tire.

The control of vertical loading on the tire is through a suitable servo controller 54 which receives an input program from a program source 56. A feedback line 58 provides feedback from an internal displacement transducer 60. The vertical positioning of the wheel 13 and tire 14 then is controlled by an error signal along the line 62 to the servovalve 42, which is connected to a suitable pressure source and return line as is conventional, and which causes the plate 48 to reciprocate according to the test program.

Figure 3:
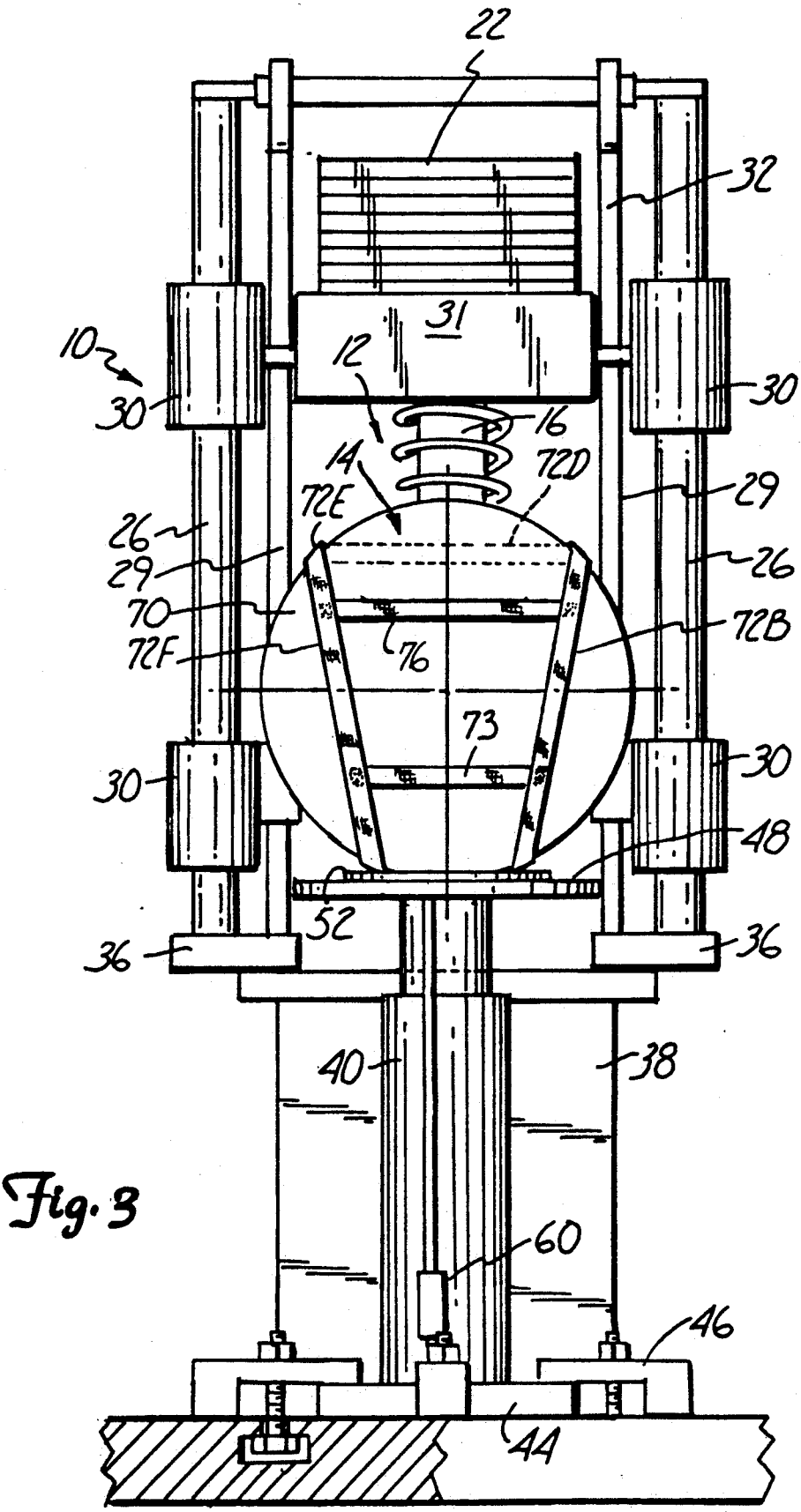
FIG. 3 is an end elevational view of the device of FIG. 1.

In order to apply a lateral load, that is, a load substantially at the level of the tire contact plane with the supporting surface such as the bearing 52, and in direction generally parallel to the axis of rotation of the wheel 13, the present invention incorporates a web harness indicated generally at 70, which is light weight and is made up of a plurality of straps including one continuous strap 72 that has a strap length or web extension 72A leading from a loading member 74. The web extension 72A is wrapped around the leading or front edge of the tire outer tread surface and is looped over a lateral sidewall with a strap section shown at 72B. Then the strap 72 is looped over the upper portion of the tire across the tread as a section 72C. The strap 72 then passes as a length section 72D (FIG. 3) around the opposite side of the tire and across the tread at 72E. The strap 72 passes back to the outer side of the tire and extends toward plate 48 with a length 72F.

Strap 72 passes underneath the trailing or rear edge of the tire outer tread surface and is extended with a strap length or web extension 72G attached to loading member 74. Two bridle straps 73 and 76 are stitched between the strap lengths 72B and 72F to hold the harness in place. Strap 76 is near the top of the tire and strap 73 is near the plate 48.

The web extensions or strap lengths 72A and 72G are then held by the loading member 74, which is fastened in turn to a load cell 78. The load cell 78 is attached to a cross member 82. Cross member 82 is supported on a pivoting wall or plate 90, the top portion of which is forced outwardly by a pair of "rolling sock" pneumatic bags or air bags 84, on opposite ends of the cross member 82. The plate 90 is pivoted relative to the table 34 about a generally horizontal axis 92. The air bags 84 in turn are used to react load against upright posts 86 that are in turn attached to the table 34. When the bags 84 are pressurized to a desired pressure, they will load the cross member 82 in direction away from the wheel and tire 13 and 14, and will create a tension load on the load cell, the loading member 74, and each of the web extensions 72A and 72G of strap 72 to apply a lateral load onto the tire through the web extensions or strap lengths 72A and 72G to the web harness 70. The loading will be resisted in the same manner within the vehicle suspension system that a load on an automobile tire will be resisted when moving on a road surface.

The bearing 52 will be used to control the friction loading of the tire contact area without having a substantial mass that has to be moved in vertical direction to achieve the lateral loading. The web harness has a very small effective mass at the tire/road contact surface, and yet will apply an adequate lateral load on the wheel and tire.

The air bags 84 can be controlled as to pressure within a desired range, so that a relatively uniform, but changeable load can be applied. Additionally, the air bags 84 can be replaced with servo controlled hydraulic actuators which provide for controlling a variable load and, if desired, a cycling load, on the tension carrying web extensions or strap lengths 72A and 72G.

The web harness 70 also could be used for loading from other directions as well. To provide for loads in an opposite lateral direction from that shown, generally parallel to the axes of rotation of the wheel and tire, the harness 70 merely has to be reversed. Alternately, two harnesses may be used for bidirectional loading. Multiple web type harnesses can be used for tension loading in fore and aft directions on one tire as well, if desired.

The harness is made of a lightweight webbing of strong fibers, that fits over the tire and provides for tension loading in at least one direction relative to the plane of rotation of the tire.

Although the present invention has been described with reference to preferred embodiments, workers skilled in the art will recognize that changes may be made in form and detail without departing from the spirit and scope of the invention.

What is claimed is:

1. An improved vehicle simulator including vertical actuator means to simulate vertical motion forces on a tire mounted on a wheel attached to a loading stand through a suspension assembly, the suspension assembly including means for providing a mass resisting vertical movement of the wheel and tire, said simulator including means for resisting lateral movement of the wheel and tire, wherein the improvement comprises at least one harness made of a flexible webbing material mounted around the tire and extending in at least one direction of loading, said harness having loading means coupled thereto and extending from the tire closely adjacent to a plane of a contact surface of the tire, and means to apply a tension force to said loading means.

2. The vehicle simulator of claim 1, wherein said loading means extends from a lateral side of the tire, substantially parallel to a central axis of the tire, and said means to apply a tension force applies a force laterally of such tire.

3. The vehicle simulator of claim 2, further including a low friction bearing provided between the tire and vertical actuator means to reduce friction in the lateral direction of loading between the tire and the vertical actuator means.

4. The vehicle simulator of claim 1, further including control means having a program which simulates dynamic forces on the tire, the control means controlling said vertical actuator means to simulate vertical motion road forces on the tire, and said loading means being attached to said harness to apply a variable lateral load to simulate lateral road forces on the tire.

5. The vehicle simulator of claim 1 wherein said loading means comprises a flexible web member that carries tension loads only.

6. The vehicle simulator of claim 1, wherein the vertical motion road forces on the tire and suspension assembly are reacted by said mass by simulating a vehicle weight carried by the tire during use.

7. The vehicle simulator of claim 1, wherein said harness comprises a pair of strap sections extending from an inner lateral side of the tire in said loading direction to an outer lateral side of the tire, said strap sections forming a loop around an upper portion of the tire, the loop extending from the outer lateral side of the tire toward the inner lateral side of the tire, and at least one cross strap extending between the pair of strap sections on the outer lateral side of the tire to aid in retaining the harness on the tire, said pair of strap sections having web extensions forming the loading means, the web extensions being coupled to a common loading member.

* * * * *